(12) United States Patent
Masuda et al.

(10) Patent No.: US 6,184,920 B1
(45) Date of Patent: Feb. 6, 2001

(54) PICTURE SIGNAL TRANSMITTING SYSTEM USING CATV NETWORK IN WHICH THE LOCAL OSCILLATOR IS TRANSMITTED SEPARATELY

(75) Inventors: Shigefumi Masuda; Hiroyuki Yatsuka; Koji Arai, all of Kawasaki (JP)

(73) Assignee: Fujitsu Limited, Kawasaki (JP)

(*) Notice: Under 35 U.S.C. 154(b), the term of this patent shall be extended for 0 days.

(21) Appl. No.: 09/012,502

(22) Filed: Jan. 23, 1998

(30) Foreign Application Priority Data

Jul. 17, 1997 (JP) .................................... 9-192741

(51) Int. Cl.[7] ...................................................... H01N 7/10
(52) U.S. Cl. ..................... 348/11; 348/6; 348/10
(58) Field of Search ................... 455/70, 71, 5.1, 455/6.3; 348/6, 8, 11–13

(56) References Cited

U.S. PATENT DOCUMENTS

| | | | |
|---|---|---|---|
| 4,803,739 | * 2/1989 | Daikoku et al. | 455/47 |
| 5,230,086 | * 7/1993 | Saul | 455/51.1 |
| 5,355,523 | * 10/1994 | Ogawa et al. | 455/71 |
| 5,812,928 | * 9/1998 | Watson, Jr. et al. | 348/5.1 |
| 5,953,045 | * 9/1999 | Tanishima | 348/10 |
| 6,011,597 | * 1/2000 | Kubo | 348/725 |

FOREIGN PATENT DOCUMENTS 4304797 10/1992 (JP).
6233157 8/1994 (JP).

* cited by examiner

*Primary Examiner*—Nathan Flynn
*Assistant Examiner*—Ngoc Vu
(74) *Attorney, Agent, or Firm*—Helfgott & Karas, P.C.

(57) ABSTRACT

A picture signal transmitting system using a CATV network sends a picture signal from a transmission path to subscribers by using a radio transmitter and receiver, and in the picture signal transmitting system, there is no physical wire connection from a tap off of the transmission path to subscribers. The picture signal transmitting system using a CATV network includes a CATV center, a first radio transmitter and receiver connected to said CATV center through a CATV transmission path, and provided near a subscriber's house for concurrently sending out a side band signal obtained by up-converting a picture signal of a frequency bandwidth including a plurality of channels with a local oscillation signal of which level is larger than that of said side band signal, and the local oscillation signal, and a second radio transmitter and receiver provided in the subscriber's house for separately receiving the picture signal and the local oscillation signal sent out from the first radio transmitter and receiver, and down-converting the frequency bandwidth of the received picture signal with the received local oscillation signal to an intermediate frequency bandwidth.

8 Claims, 11 Drawing Sheets

70MHz~1GHz

FIG. 6B

DOWNWARD SIGNAL

UPWARD SIGNAL

DOWNWARD SIGNAL

FIG. 8B

UPWARD SIGNAL

PICTURE SIGNAL TRANSMITTING SYSTEM USING CATV NETWORK IN WHICH THE LOCAL OSCILLATOR IS TRANSMITTED SEPARATELY

BACKGROUND OF THE INVENTION

1. Field of the Invention

The present invention relates to a picture signal transmitting system. More particularly, it relates to a picture signal transmitting system in which picture and digital signals sent through coaxial or optical fiber cables from a CATV network center are transmitted to each subscriber via a junction terminal without converting carrier-modulation format of the picture and digital signals.

2. Description of the Related Art

In recent years, a picture signal transmitting system employing a CATV network is widely used for linking between a CATV center and subscribers through coaxial or optical fiber cables and transmitting high-quality picture and digital signals to the subscribers.

Figure 10:
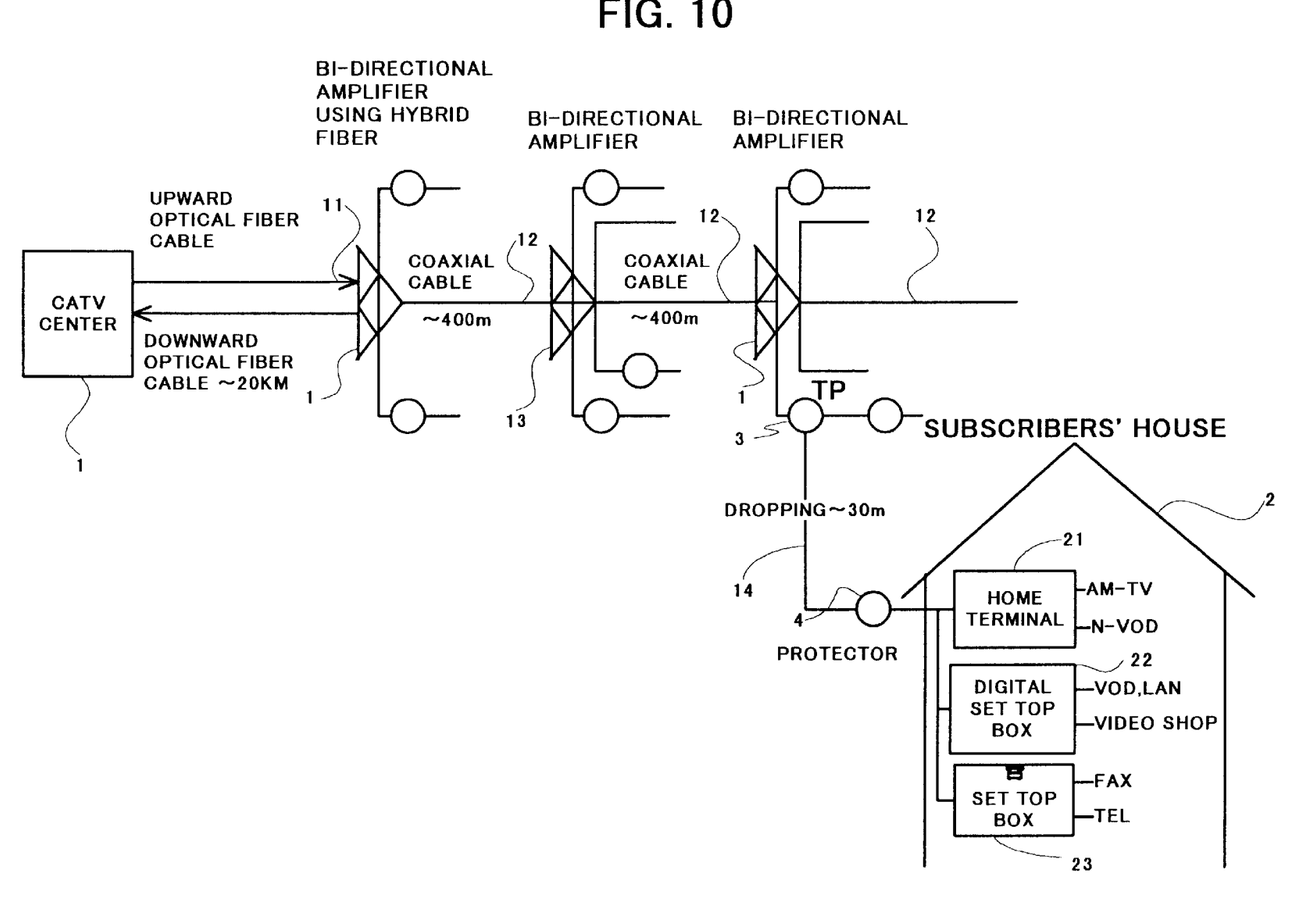
FIG. 10 is a structural diagram of an outline in a currently used CATV picture signal transmitting system.

FIG. 10 shows a structural diagram showing an outline of a currently used picture signal transmitting system employing a CATV network. In the picture signal transmitting system, a main transmission path is formed of an optical fiber cable 11 and a coaxial cable 12 used both for upward and downward transmission.

Bi-directional amplifiers 13 are positioned at certain intervals on the main transmission path. Further, a branch transmission path 14 is extended from the main transmission path to a subscriber through a tap off 3, i.e., a junction terminal, in order to link to a protector 4 in subscribers' house 2. A home terminal 21, a digital set top 22, a telephone set top box 23 respectively provided in subscribers' house 2 are connected to protector 4.

Figure 11:
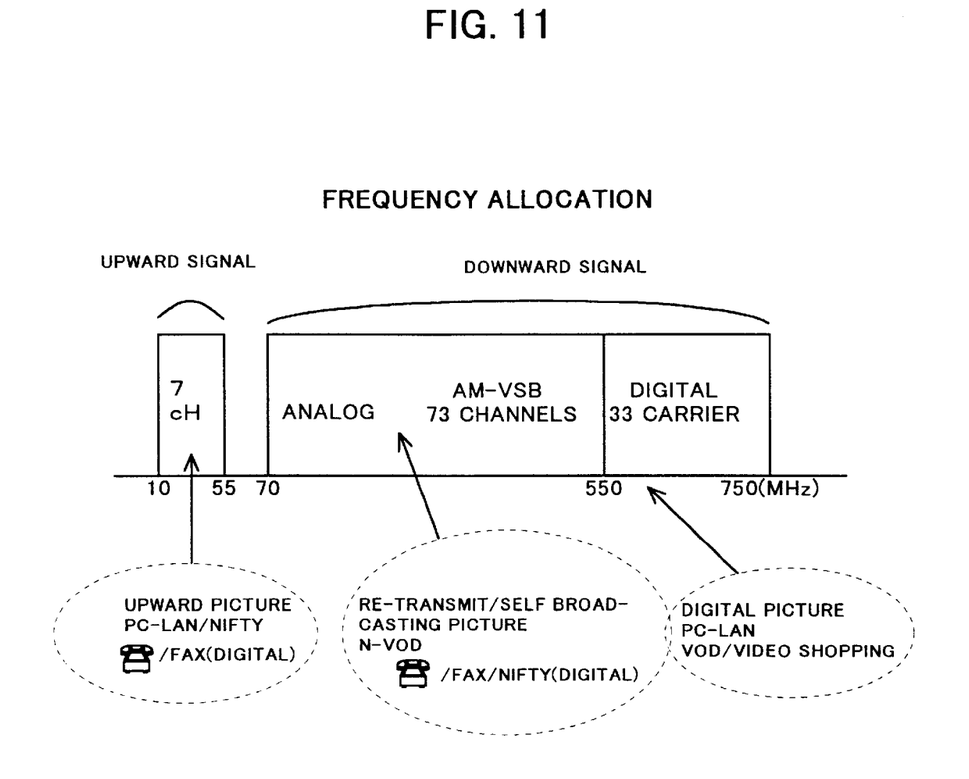
FIG. 11 explains a signal frequency assignment on the CATV picture signal transmitting system as shown in FIG. 10.

FIG. 11 is a diagram for explaining frequency allocation of signals in the picture signal transmitting system employing the CATV network shown in FIG. 10. Downward signals flowing from CATV center 1 toward subscribers' house 2, for example, analog picture signals required for 73 channels are allocated in the frequency band 70–550 MHz. Digital picture signals for 33 carriers are transmitted in the frequency band 550–750 MHz.

Further, upward picture signals required for 7 channels flowing from subscribers' house 2 toward CATV center 1 are allocated in the frequency band 10–55 MHz.

In such the currently used picture signals transmitting system using a CATV network, branch transmission path 14 is extended from the main transmission path through tap off 3 to each subscriber, and is linked to protector 4 of the subscriber's house. A distance between tap off 3 and protector 4 of subscribers' house 2 may be allowed to be at most 30 m extent.

In this example, the above-described main transmission path formed of optical fiber cable 11 and coaxial cable 12 is generally extended by using utility poles as props.

Therefore, installation of the picture signal transmitting system using a CATV network to areas where there is no prop requires new props near each subscribers' houses. Further, there is a case where any utility pole can not be provided to keep views.

More particularly, when distributing the CATV picture signals to a gathered residence section, such as an apartment or a condominium, the signal transmission can be easily executed when transmission paths have been wired to each subscriber in the gathered residence section. Otherwise, it is required to connect branch transmission path 14 for dropping signals from tap off 3. In this case, there are problems of increasing the cost and impairing views.

Further, in the bi-directional CATV system, when subscribers live in the gathered residence section, a control signal sent from each subscriber is transmitted toward the CATV center through a mixer so that noise becomes accumulated.

SUMMARY OF THE INVENTION

Accordingly, it is an object of the present invention to provide a picture signal transmitting system employing a CATV network in which there is no need to provide a branch transmission path for dropping signals from a tap off to subscribers' houses.

It is another object of the present invention to provide a picture signal transmitting system employing a CATV network by which CATV picture signals can be transmitted to areas where there is no prop, at a low cost.

It is further object of the present invention to provide a picture signal transmitting system employing a CATV network by which noise accumulated caused in the gathered residence section can be reduced or diminished even when bi-directional communication is performed.

DESCRIPTION OF THE PREFERRED EMBODIMENTS

Embodiments according to the present invention will be now explained in accompanying with the attached drawings. Throughout the following descriptions, the same reference numerals and symbols are used to denote and identify corresponding or identical components.

Figure 1:
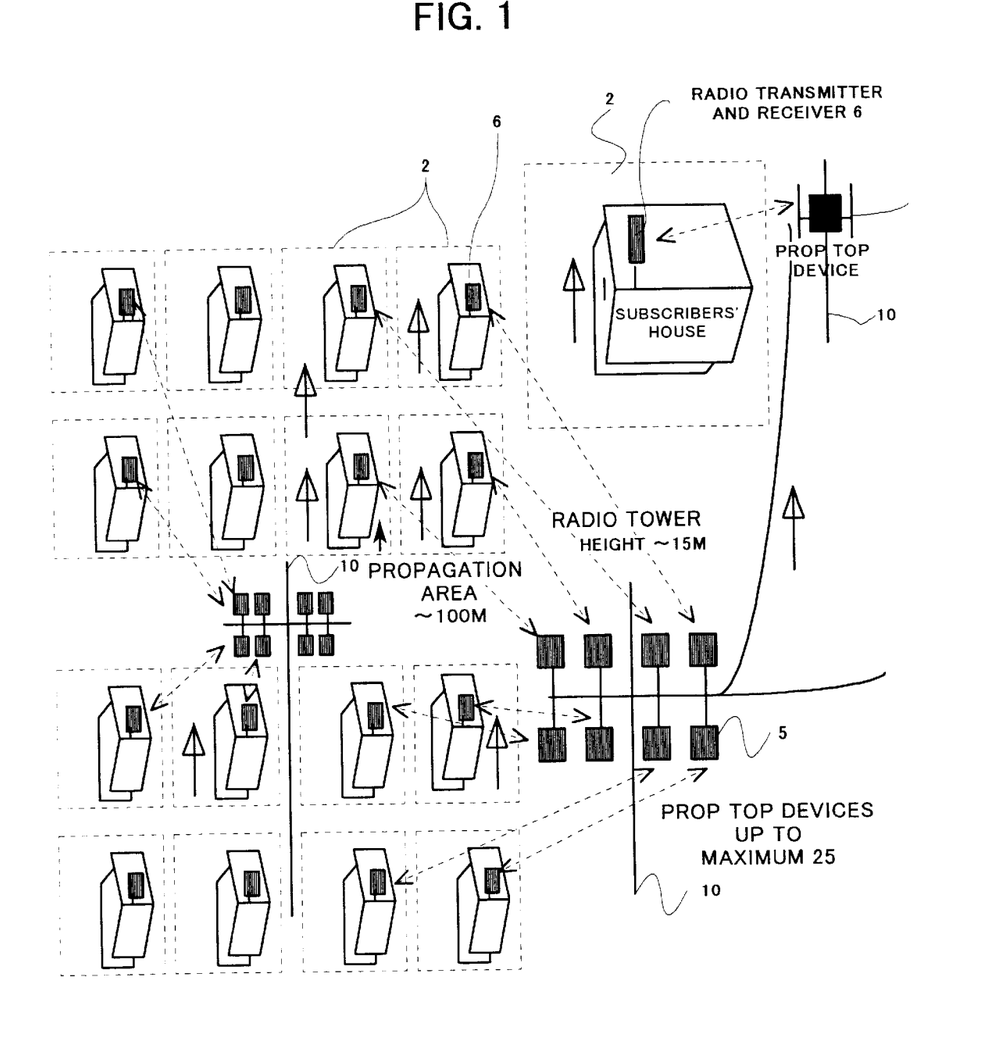
FIG. 1 is a diagram for explaining a feature of a picture signal transmitting system employing the present invention.

FIG. 1 is a diagram for explaining an outline of a CATV picture signal transmitting system employing the present invention. In FIG. 1, a prop 10 such as a utility pole can be positioned in each area where subscribers are gathered ranged within an approximately 100 m radius. Maximum 25 prop top devices 5 can be positioned on each prop 10 as needed. Prop top device 5 is a radio transmitter/receiver for millimeter wavelength signals in this embodiment. Hereinafter, the prop 10 on which prop top devices 5 are provided is called as a radio tower.

Prop top device 5 is connected to CATV center 1 through a CATV main transmission path formed of a coaxial cable. Hereinafter, prop device 5 is called as a radio transmitter and receiver for the CATV center. On the other hand, a device 6 provided at the eaves of each subscriber's house 2 is to facilitate communications with radio transmitter and receiver 5. Hereinafter, the device 6 is called as a radio transmitter and receiver for the subscriber's house.

In the present invention, when facilitating communication with millimeter wavelength signals between radio transmitter and receivers 5 and 6, it is possible to propagate signals within 100 m extent. Therefore, in comparison with the case where the distance between tap off 3 and subscribers' house 2 is extent 30 m in the currently used system as explained in FIG. 10, the propagation distance can be extended. Thus, the number of radio towers 10 can be smaller than that in the currently used system.

Further, each subscriber who lives in a gathered resistance section, such as an apartment or a condominium, can easily communicate with radio transmitter and receiver 5 by setting radio transmitter and receiver 6 on a veranda or porch of each house.

Figures 2A, 2B:
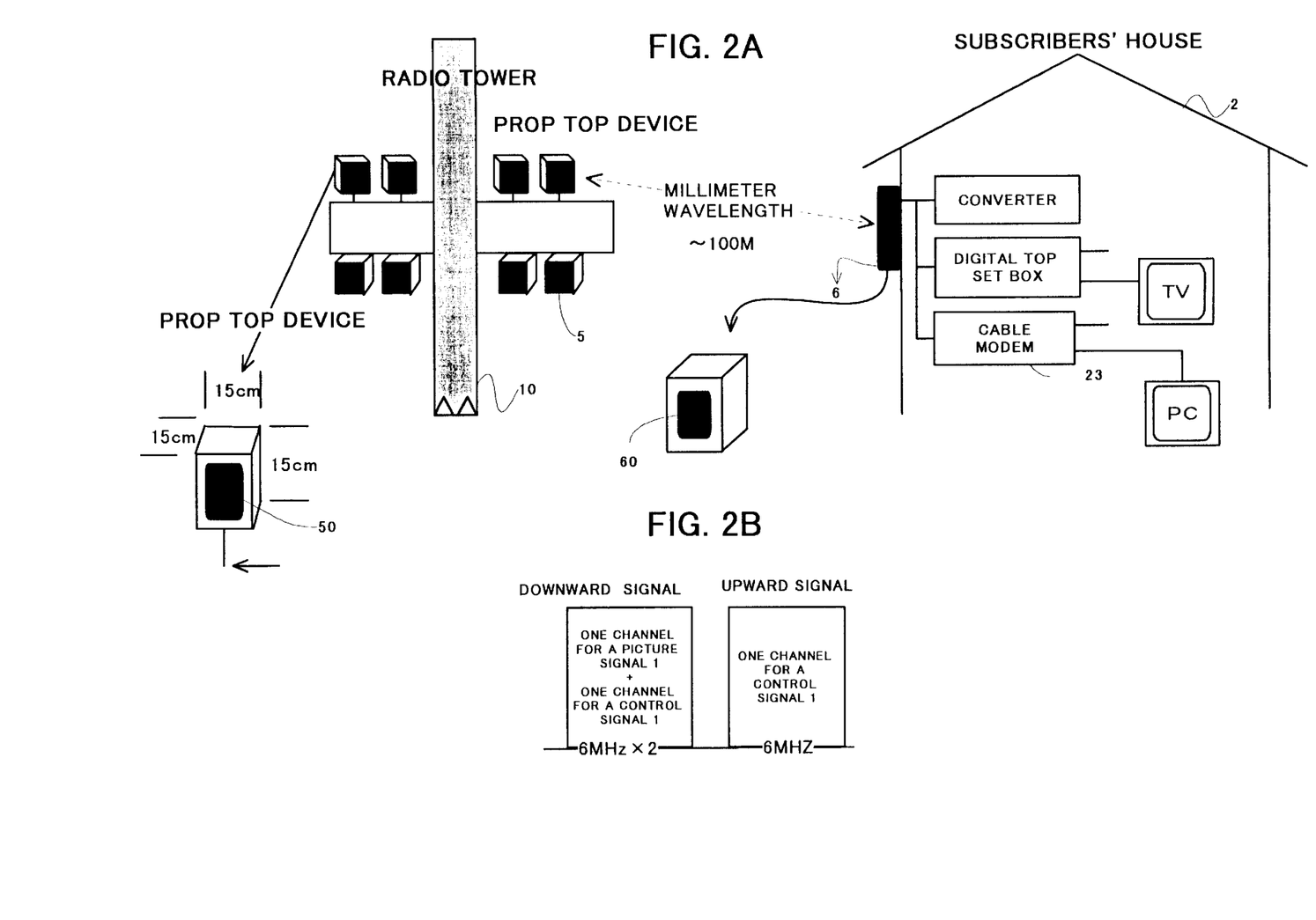
FIGS. 2A and 2B are diagrams for further explaining a relationship between a radio transmitter and receiver 5 for a CATV center and a radio transmitter and receiver 6 for a subscriber.

FIGS. 2A and 2B are diagrams for explaining a relationship between radio transmitter and receiver 5 for CATV center 1 and radio transmitter and receiver 6 for the subscriber in detail. The height×width×depth of each of the plurality prop top devices, i.e., radio transmitter and receivers 5 for CATV center 1, which are positioned on radio tower 10, are approximately 15 cm, respectively.

On the other hand, the size of radio transmitter and receiver 6 positioned at the eaves of subscribers' house 2 is the same as radio transmitter and receiver 5 for the CATV center. Further, radio transmitter and receiver 5 for the CATV center and radio transmitter and receiver 6 for the subscriber respectively include antennas 50 and 60 for transmitting and receiving signals of millimeter wavelengths, which are facing to each other.

FIG. 2B shows frequency bands for upward and downward signals. A downward signal transmitted from radio transmitter and receiver 5 for the CATV center to radio transmitter and receiver 6 for subscribers' houses 2 is a side-band signal including a picture signal and a control signal which are respectively of one channel having 6 MHz frequency band width.

Further, an upward signal transmitted from radio transmitter and receiver 6 for the subscriber's houses to radio transmitter and receiver 5 for the CATV center has a control signal of one channel.

Figure 3A:
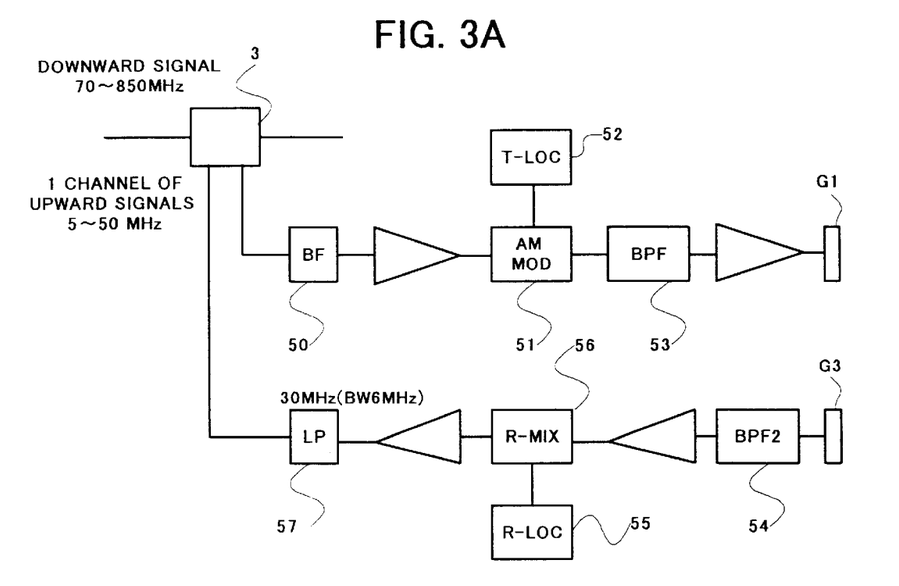
FIGS. 3A and 3B are schematic block diagrams showing an embodiment between radio transmitter and receiver 5 for the CATV center side and radio transmitter and receiver 6 for the subscriber side used in a bi-directional CATV picture signal transmitting system according to the present invention.
Figure 3B:
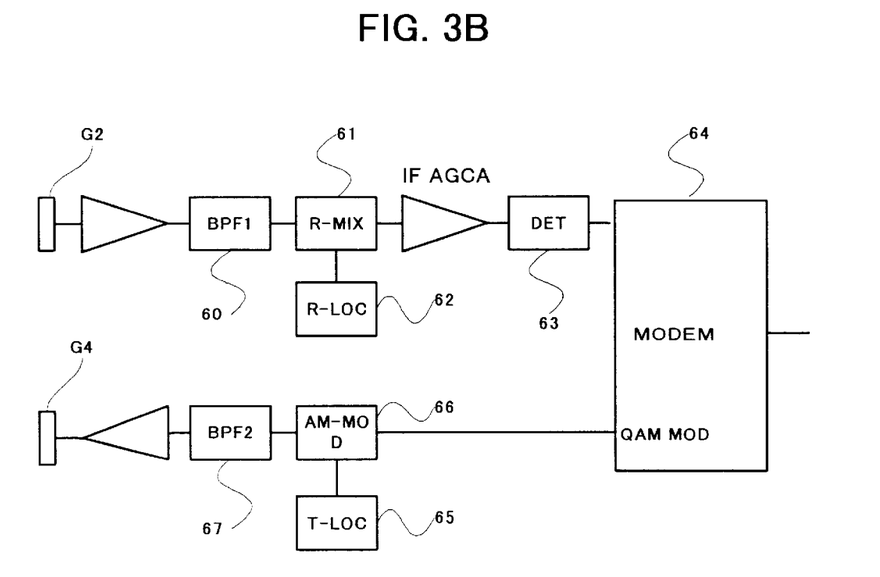

FIGS. 3A and 3B are block diagrams for explaining radio transmitter and receiver 5 for the CATV center and radio transmitter and receiver 6 for the subscriber's houses, respectively in an embodiment of a bi-directional CATV picture signal transmitting system according to the present invention.

In FIG. 3A, a downward signal including a plurality of channels, which is branched from a tap off or CATV junction terminal 3 is inputted to a frequency converter 51 through a band pass filter 50. Frequency converter 51 up-converts a frequency bandwidth of the downward signal to a high frequency bandwidth with a local oscillation signal oscillated from a local oscillator 52, and modulates the up-converted downward signal in amplitude with an auxiliary signal. Then, a side-band signal of the amplitude modulated downward signal is passed through a band pass filter 53 and is radiated from antenna G1.

Here, it should be noted that frequency of the downward signal is up-converted, but the downward signal itself does not undergo conversion of carrier-modulation format, such as analog to PCM.

On the other hand, in FIG. 3B, radio transmitter and receiver 6 for the subscriber's houses receives the side-band signal having a plurality of channels by an antenna G2, and inputs the received signal to a frequency converter 61 through a band pass filter 60. Frequency converter 61 down-converts a high frequency bandwidth of the side-band signal having the plurality of channels to an intermediate frequency by a local oscillation signal oscillated from the local oscillator. A detector 63 detects the received signal of the intermediate frequency bandwidth, and the detected, received signal is converted to a picture signal and a control signal corresponding to the auxiliary signal, respectively of a base-band frequency.

Again, in the radio transmitter and receiver 6, the received signal does not undergo any conversion of carrier modulation format.

When transmitting a control signal from radio transmitter and receiver 6 for subscriber's houses 2 to radio transmitter and receiver 5 for CATV center 1, a modem circuit 64 performs QAM (quadrature amplitude modulation) of 64 values on the control signal.

A converter 66 converts the frequency of the QAM control signal by a local oscillation signal oscillated in local oscillator 65, and transmits the converted QAM control signal through a band pass filter 67 to an antenna G4 toward radio transmitter and receiver 5 for CATV center 1.

Returning to FIG. 3A, radio transmitter and receiver 5 for the CATV center receives the control signal transmitted from radio transmitter and receiver 6 for the subscriber's houses by antenna G3, and inputs the received control signal to a frequency converter 56 through a band pass filter 54. Frequency converter 56 down-converts the frequency of the received control signal by a local oscillation signal in a local oscillator 55 and transmits it to the CATV transmission path toward CATV center 1 through low pass filter 57 and CATV junction terminal 3.

Use of radio transmitter and receivers 5 and 6 shown in FIGS. 3A and 3B provides a CATV picture signal transmission system in which there is no need to connect to branch transmission path 14 for dropping from tap off 3 according to the present invention. Therefore, it becomes possible to transmit a CATV picture signal at a low cost even to areas where there is no utility pole.

In the embodiment shown in FIGS. 3A and 3B, radio transmitter and receivers 5 and 6 respectively include local oscillation to modulate the received local oscillation signal as it is, and return it. Therefore, it is not suitable to transmit wide band picture data.

On the other hand, when a picture demodulator provided on subscribers' house 2 is, for example, a MPEG-2 decoder, it is desirable that stability of a carrier frequency of the signal transmitted from radio transmitter and receiver 5 for the CATV center to radio transmitter and receiver 6 for the subscriber, is within ±20 KHz, for example, when the signal is a 64 QAM signal.

Therefore, it is required to highly stabilize the frequency of the local oscillation signal on both transmitting and receiving sides, for example, up to $10^{-8}$ order of $\Delta f$ for a millimeter wavelength signal.

Figure 4A:
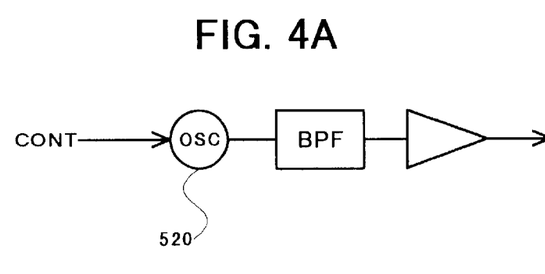
FIGS. 4A and 4B are structural block diagrams of a local oscillator.
Figure 4B:
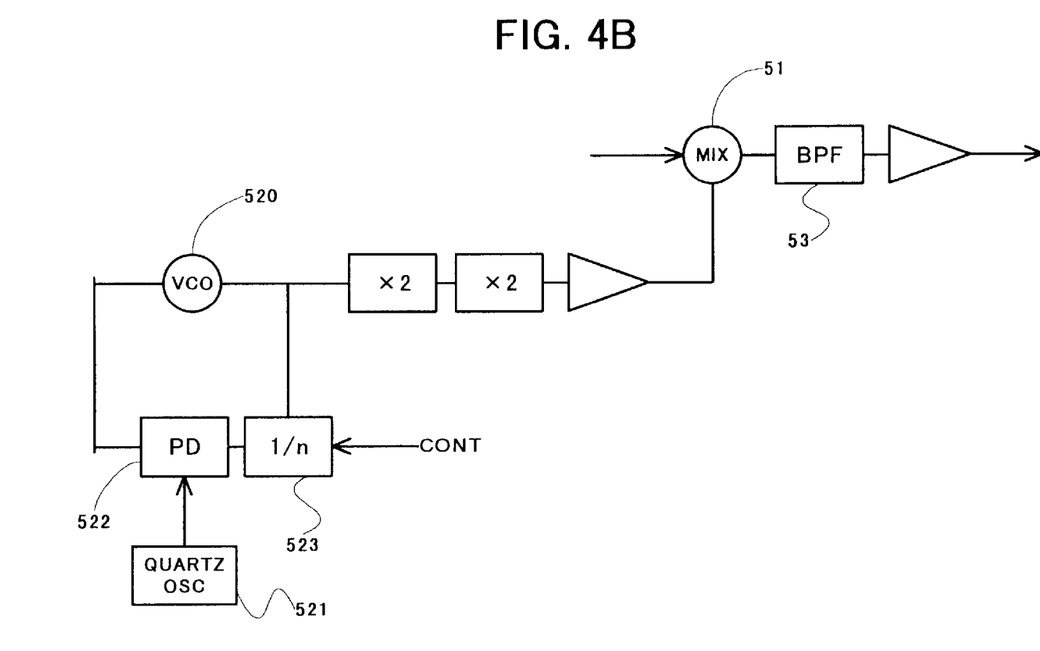

FIGS. 4A and 4B are structural diagrams of a local oscillator. When employing only an oscillator 520 shown in FIG. 4A, stabilization up to the order of maximum $10^{-4}$ can be obtained at most. In a structure shown in FIG. 4B, a phase comparator 522 compares the phases of signals output from a quartz oscillator 521 and a frequency divider 523, and controls frequencies oscillated by a voltage control oscillator 520 with a phase compared output.

Stabilization up to the order of maximum $10^{-7}$ can be obtained by the structure shown in FIG. 4B. However, the structure becomes complex so that the size of the device becomes larger, and the cost of the device becomes higher. It is necessary to employ the millimeter wavelength band to facilitate communications between radio transmitter and receiver 5 for the CATV center and radio transmitter and receiver 6 for the subscribers in order to allocate a large amount of picture data. When employing an oscillator of which the frequency is stabilized to $\Delta f$ less than the order of $10^{-5}$ in the millimeter wavelength band, the cost of the oscillator further becomes higher.

Further, it is required to use an oscillator of which the frequency is highly stabilized and of which the price is expensive as radio transmitter and receiver 6 for the subscribers. It is not advantageous to the subscribers.

Figure 5:
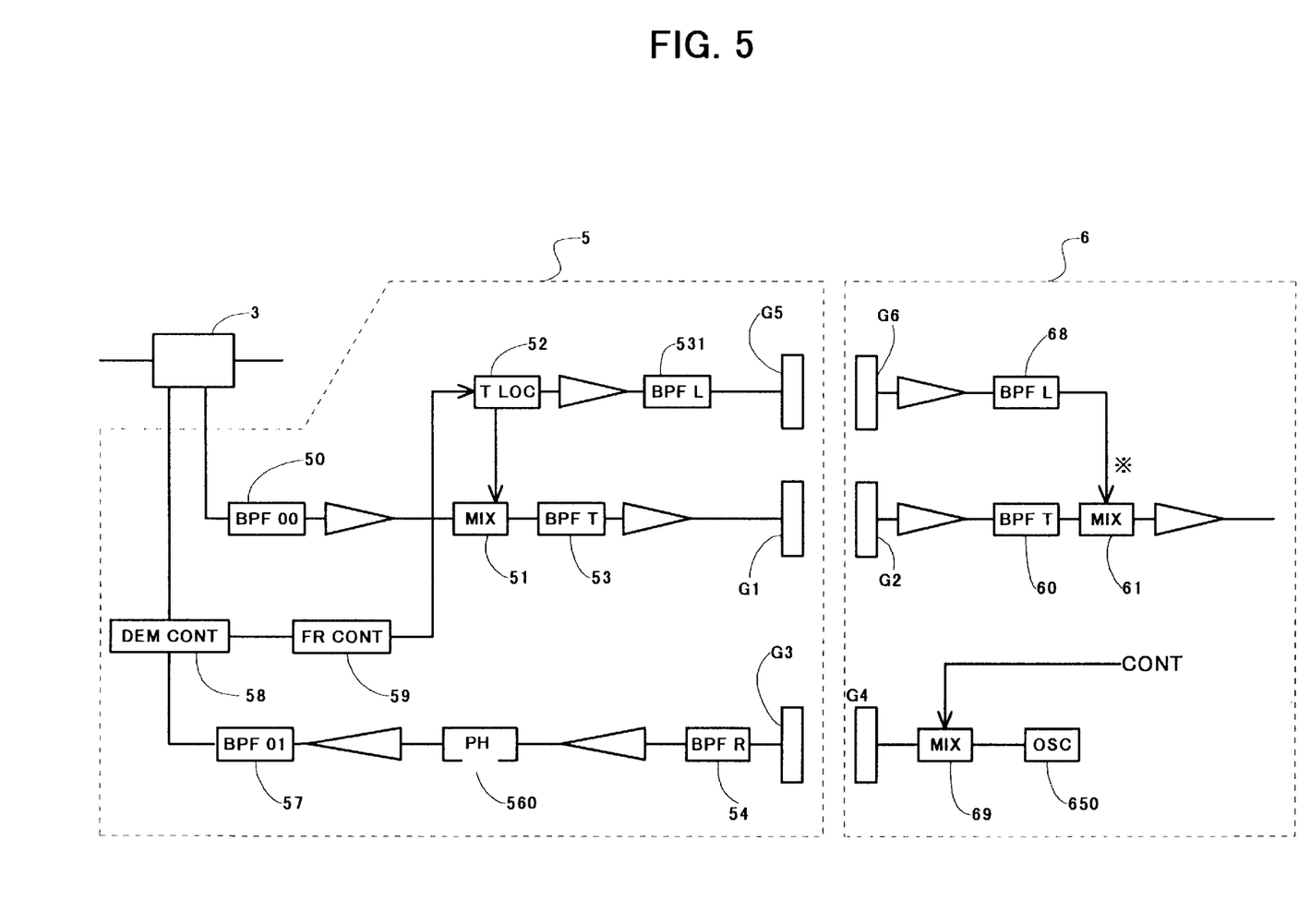
FIG. 5 is a structural block diagram showing a relationship between radio transmitter and receiver 5 for the CATV center and radio transmitter and receiver 6 for the subscriber according to a second embodiment of the present invention.

FIG. 5 is a structural block diagram of radio transmitter and receiver 5 for the CATV center and radio transmitter and receiver 6 for the subscribers in a second embodiment of the present invention to overcome the inconvenience of the device in the first embodiment of which structure becomes complex and price becomes higher.

In the second embodiment shown in FIG. 5, a side-band signal formed of a plurality of channel signals of which frequencies are up-converted to high frequencies, and an local oscillation signal of which level is larger than the side-band signals are concurrently transmitted from radio transmitter and receiver 5 for CATV center 1 to radio transmitter and receiver 6 for the subscribers' houses. Radio transmitter and receiver 6 for the subscribers' house selects and receives the side band signal and the local oscillation signal, independently, and mixes them to down-convert the frequencies of the mixed signals to the intermediate frequency.

Additionally, the radio transmitter and receiver 5 limits the frequency band width of the plural channel signals sent from CATV center 1 to a bandwidth of only channels required for the subscribers' side so as to reduce the transmitting power of radio transmitter and receiver 5 for the CATV center.

Figure 6A:
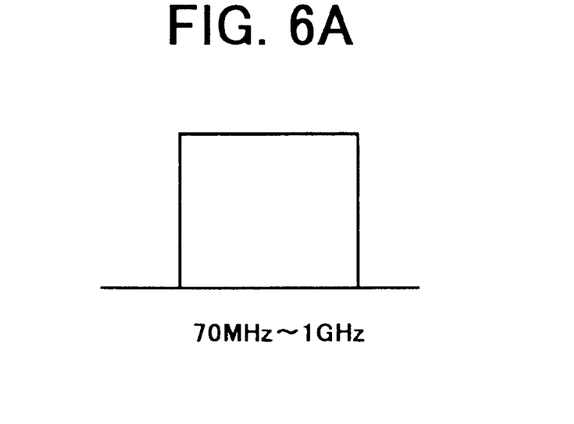
FIGS. 6A, 6B and 6C are diagrams for explaining signal frequency assignment in a CATV picture signal transmitting system according to the present invention.

In comparison with the structure shown in FIGS. 3A and 3B, radio transmitter and receiver 5 for the CATV center can vary the frequencies of the local oscillation signal oscillated from local oscillator 52 on the transmitter. The downward signal branched by the junction terminal 3 is inputted to frequency converter 51 through a band pass filter 50. Frequency converter 51 modulates the downward picture signal (refer to FIG. 6A) with the local oscillation signal oscillated from local oscillator 52 on the transmitter and up-converts it. In addition, the side band signal is sent out toward radio transmitter and receiver 6 for the subscriber through band pass filter 53 from antenna G1.

The local oscillation signal oscillated from local oscillator 52 concurrently passes through band pass filter 531 and is sent out toward radio transmitter and receiver 6 for the subscribers through antenna G5.

Figure 6B:
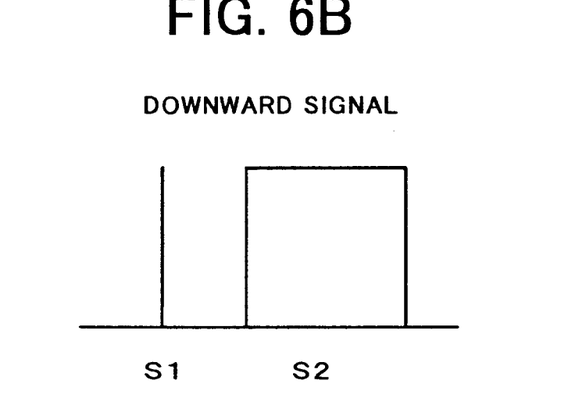
Figure 6C:
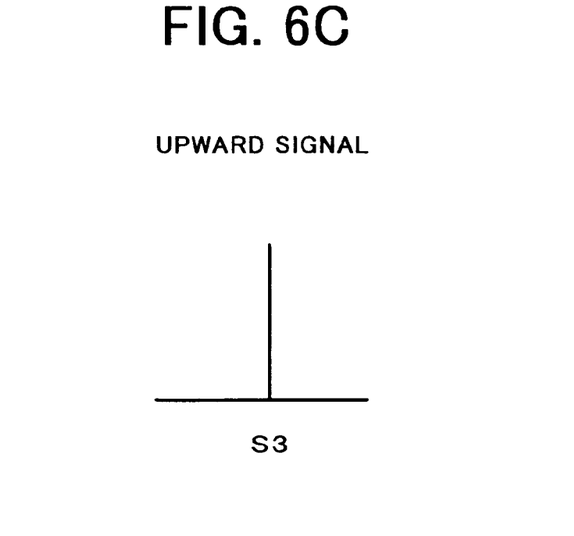

Therefore, frequency allocation of the downward signal transmitted from antennas G1 and G5 includes the local oscillation signal S1 and the picture signal S2 as shown in FIG. 6B.

Radio transmitter and receiver 6 for the subscriber receives the side band signal of the picture signal from antenna G2 similarly to the example shown in FIGS. 3A and 3B and inputs the side band signal to frequency converter 61 through band pass filter 60. The transmitter and receiver 6 further receives the local oscillation signal oscillated from local oscillator 52 and transmitted from antenna G5, and inputs it to frequency converter 61 through a band pass filter 68.

Then, frequency converter 61 mixes the received side band signal and the local oscillation signal, and down-converts it to convert the frequency of the signal to an intermediate frequency. A detector, not shown in FIG. 5, detects the received signal of which frequency is converted to the intermediate frequency and further demodulates it to a base band picture signal and a control signal.

In addition, in radio transmitter and receiver 6 for the subscribers, an injection synchronizing oscillator may be employed to inject the received local oscillation signal to the injection synchronizing oscillator. Thereby, the level of the local oscillation signal oscillated from the local oscillator in the receiver of the subscriber can be amplified and a distance between radio transmitter and receiver 5 for the CATV center, and therefore, radio transmitter and receiver 6 for the subscriber can be extended.

In radio transmitter and receiver 6 for the subscriber, there is no need to concurrently receive all the CATV picture signals in the frequency bandwidth. That is, only channel signals of frequency bandwidths selected by the subscriber are required to be received in the device 6. Therefore, radio transmitter and receiver 6 shown in FIG. 5 has an oscillator 650 for oscillating a fixed local oscillation signal. Further, a mixer 69 mixes the fixed local oscillation signal oscillated from local oscillator 650 with a control signal CONT, and then, the mixed signal outputtted from mixer 69 is transmitted to radio transmitter and receiver 5 for the CATV center through an antenna G4.

It is also possible to identify each subscriber by shifting the frequency of the fixed local oscillation signal per each subscriber.

Radio transmitter and receiver 5 for the CATV center may receive a signal through an antenna G3. A phase detector 560 controls a phase of the received signal through a band pass filter 54. Further, the phase controlled signal is inputted to the control signal demodulator 58 through a band pass filter 57.

The control signal demodulator 58 receives and demodulates a control signal sent from the CATV center with the control signal sent from radio transmitter and receiver 6 for the subscriber and transmits a demodulated signal having a level corresponding to the control signal sent from the CATV center to a frequency controller 59. Frequency controller 59 controls local oscillator 52 corresponding to the control signal sent from the CATV center.

Accordingly, local oscillator 52 outputs a local oscillation signal of which frequency is shifted as corresponding to the control signal sent from the CATV center. Thereby, frequency converter 51 modulates and outputs the CATV picture signal outputted from band pass filter 50. The signal modulated by frequency converter 51 is outputted through band pass filter 53. Therefore, the frequency band of the signal radiated from antenna G1 is equivalent to a pass filter band width of band pass filter 53.

Figure 7A:
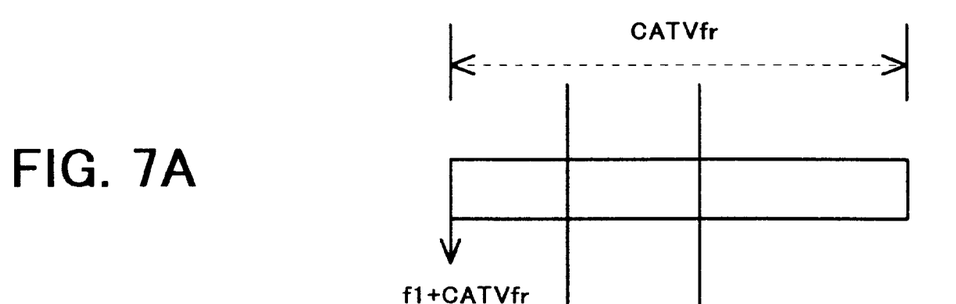
FIGS. 7A, 7B and 7C explain that frequency band of a signal transmitted from a radio transmitter and receiver 5 for the CATV center is limited to a band width of the band pass filter.
Figure 7B:
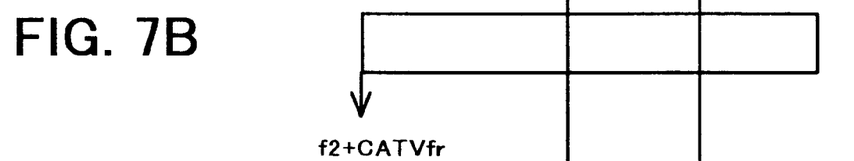
Figure 7C:
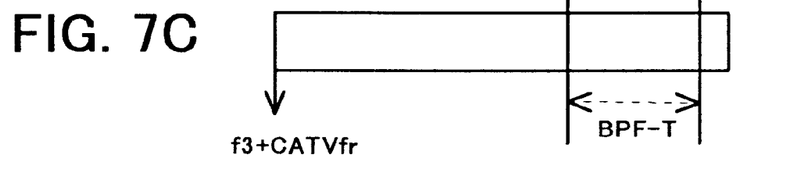

This situation will be now explained in accompanying with FIGS. 7A to 7C. In FIGS. 7A to 7C, CATVfr is a frequency bandwidth of the picture signal branched from tap off 3. FIGS. 7A to 7C show frequency bandwidths respectively shifted by modulating with the local oscillation signal f1, f2 and f3 in frequency converter 51.

Additionally, in FIGS. 7A to 7C, BPF-T is a pass bandwidth of band pass filter 53. As the pass bandwidth of band pass filter 53 is constant, the picture signal sent out from antenna G1 has a predetermined frequency bandwidth of which frequency is shifted according to the local oscillation signals.

In this way, in the embodiment shown in FIG. 5, radio transmitter and receiver 6 for the subscriber selectively receives the picture signal and the local oscillation signal independently. Then, radio transmitter and receiver 6 uses the received local oscillation signal as a local oscillation signal to convert to an intermediate frequency signal.

Therefore, it is possible to reduce the size of radio transmitter and receiver 6 for the subscriber because there is no need to provide an oscillator oscillating a local oscillation signal. It is also possible to make the stability of a local oscillation signal depend on accuracy of local oscillator 52 in radio transmitter and receiver 5 for the CATV center.

Additionally, radio transmitter and receiver 5 for the CATV center can decrease power consumption of the transmitter, as the signal can be transmitted in a required frequency bandwidth selected by a subscriber.

Figure 8A:
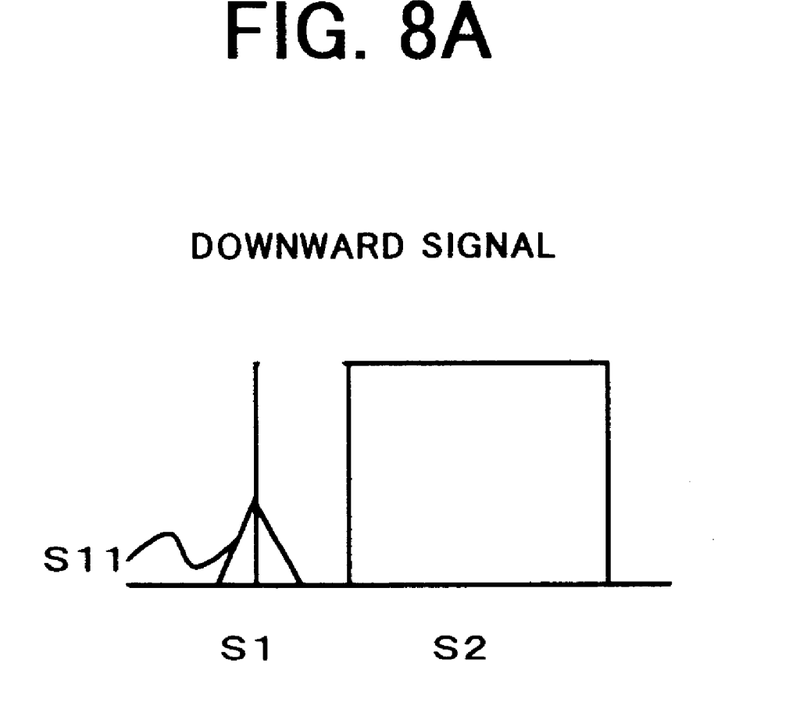
FIGS. 8A and 8B show an other embodiment according to the present invention, in which a local oscillation signal is used as a narrow band frequency modulation signal.
Figure 8B:
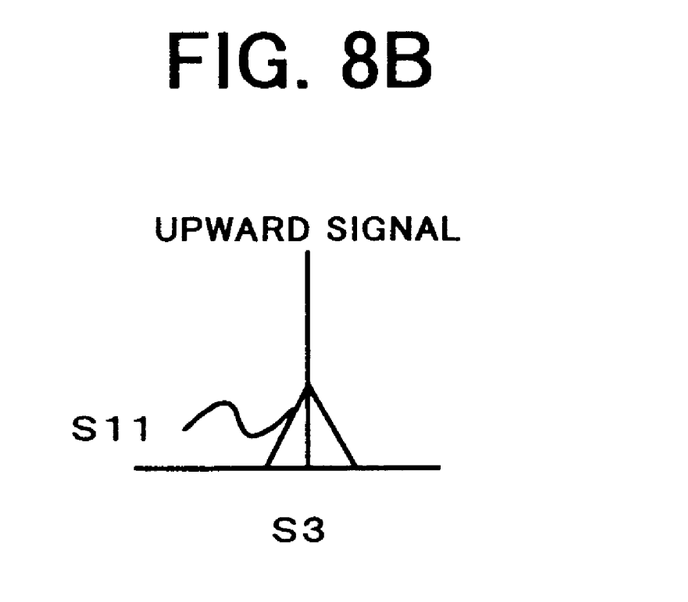

FIGS. 8A and 8B show other embodiment of the present invention. In FIG. 8A, a local oscillation signal S1 is modulated with a narrow band modulation signal, for example, a triangular waveform signal S11 and transmitted.

The signal S1 shown in FIG. 8A is a local oscillation signal oscillated from radio transmitter and receiver 5 for the CATV center, which is modulated by the triangular wave signal S11 having a narrow frequency bandwidth. In FIG. 8A, a signal S2 includes a plurality of channels. FIG. 8B shows that a local oscillation signal used as a control signal transmitted from radio transmitter and receiver 6 for the subscriber is modulated by a narrow-band modulation signal of a triangular waveform. Such the structure allows the modulator to be simplified.

Further, radio transmitter and receiver 6 for the subscriber can use the narrow band modulation signal of a triangular wave, which is transmitted from radio transmitter and receiver 5 for the CATV center, as a modulation signal for a control signal to be transmitted to radio transmitter and receiver 5 for the CATV center as it is. In this case, the local oscillating circuit can be simplified in radio transmitter and receiver 6 for the subscriber.

Figure 9A:
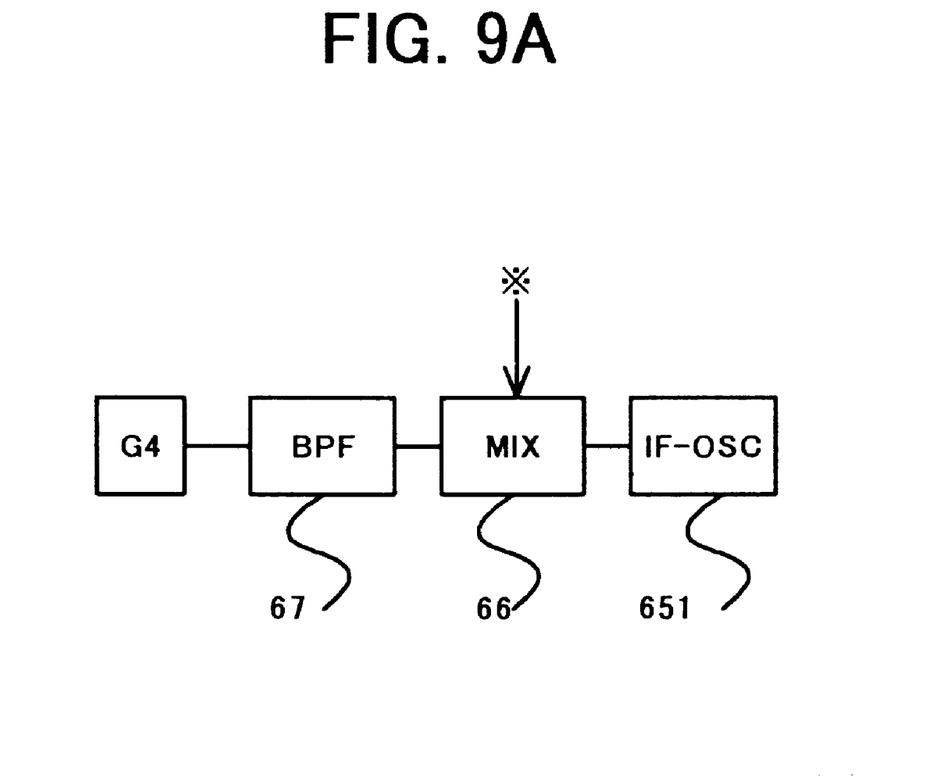
FIGS. 9A and 9B explain an example for using the narrow band frequency modulation signal transmitted from radio transmitter and receiver 5 for CATV center 1 when transmitting control signals from radio transmitter and receiver 6 for the subscriber.
Figure 9B:
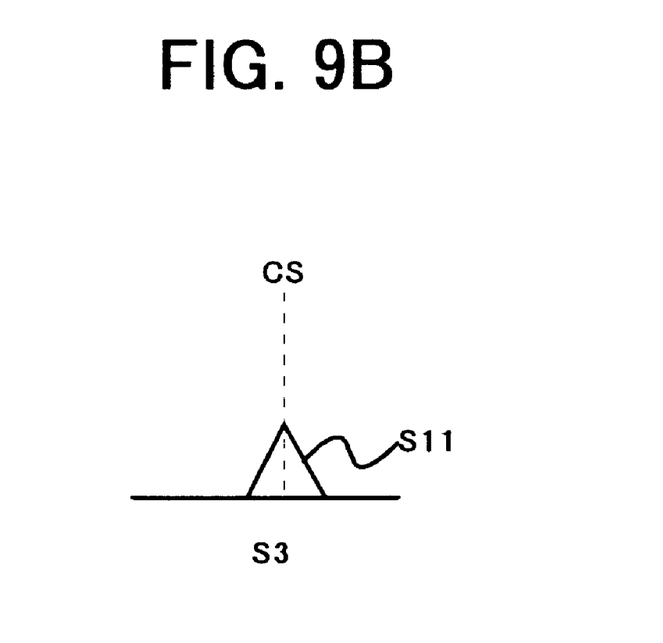

FIGS. 9A and 9B show an example where the narrow-band modulation signal of a triangular waveform transmitted from radio transmitter and receiver 5 for the CATV center is used as it is, when transmitting a control signal from radio transmitter and receiver 6 for the subscriber.

In FIG. 9A, a mixer 66 mixes a control signal CS, illustrated as a broken line shown in FIG. 9B, outputted from an IF band oscillator 651 with a narrow-band modulation signal S11, illustrated as a triangular wave section shown in FIG. 9B, which is transmitted from radio transmitter and receiver 5 for the CATV center, and is obtained from a band pass filter 68 of radio transmitter and receiver 6 for the subscriber shown in FIG. 5. Then, the modulated signal is radiated as a side band signal from an antenna G4 through a band pass filter 67.

As explained above according to the drawings, the present invention provides a CATV picture signal transmitting system in which there is no need to connect a branch transmission path for dropping from a tap off.

Accordingly, it is possible to transmit a CATV picture signal at a low cost even to areas where there is no prop and to diminish accumulated noise generated in a gathered residence section, such as an apartment or a condominium, even when facilitating bi-directional communications.

The picture signal transmitting system according to the present invention has a characteristic in that radio transmitter and receiver to transmit picture and digital signals sent from a CATV center to each subscriber, without converting carrier modulation format of the picture and digital signal, and the radio transmitter and receiver may be constructed in small size.

The present invention may be embodied in other specific forms without departing from the sprit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A picture signal transmitting system using a CATV network comprising:
   a CATV center;
   a first radio transmitter and receiver connected to said CATV center through a CATV transmission path, and provided near a subscriber's house for sending out a side band signal obtained by up-converting of a picture signal having a frequency bandwidth including a plurality of channels with a local oscillation signal, and the local oscillation signal of which level is larger than that of said side band signal, separately; and
   a second radio transmitter and receiver provided in said subscriber's house for separately receiving the side band signal and the local oscillation signal sent out from the first radio transmitter and receiver, and mixing the received side band signal with the received local oscillation signal to down-convert the received side band signal to an intermediate frequency bandwidth.

2. The picture signal transmitting system according to claim 1,
   wherein said second radio transmitter and receiver modulates a control signal with the received local oscillation signal and sends the modulated control signal to the first radio transmitter and receiver.

3. The picture signal transmitting system according to claim 1,
   wherein the second radio transmitter and receiver superposes a modulation signal with a narrow frequency bandwidth over the received local oscillation signal, and sends out the superposed local oscillation signal as a control signal.

4. The picture signal transmitting system according to claim 3, wherein said first radio transmitter and receiver receives the control signal as a channel selection request, and controls to select channels according to the received control signal.

5. The picture signal transmitting system according to claim 3, wherein said first radio transmitter and receiver includes a modulator for modulating the picture signal with the local oscillation signal, and a controller for controlling the frequency of the local oscillation signal according to the control signal sent from the second radio transmitter and receiver, so that the frequency bandwidth of the modulated picture signal is shifted.

6. The picture signal transmitting system according to claim 5,

Wherein the first radio transmitter further includes a band pass filter having a fixed pass frequency bandwidth, connected to an output of the modulator for passing the modulated signal from the modulator within the fixed pass frequency bandwidth.

7. The picture signal transmitting system according to claim 6,

Wherein the fixed pass frequency bandwidth is assigned to each of subscribers, differently.

8. The picture signal transmitting system according to claim 1,

Wherein the second radio transmitter and receiver includes an injection synchronizing oscillator, to which the received local oscillation signal is injected.

* * * * *